US012297788B2

(12) United States Patent
Dölker

(10) Patent No.: US 12,297,788 B2
(45) Date of Patent: May 13, 2025

(54) CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

(71) Applicant: Rolls-Royce Solutions GmbH, Friedrichshafen (DE)

(72) Inventor: Armin Dölker, Friedrichshafen (DE)

(73) Assignee: Rolls-Royce Solutions GmbH, Friedrichshafen (DE)

(*) Notice: Subject to any disclaimer, the term of this patent is extended or adjusted under 35 U.S.C. 154(b) by 0 days.

(21) Appl. No.: 18/536,367

(22) Filed: Dec. 12, 2023

(65) Prior Publication Data

US 2024/0117779 A1 Apr. 11, 2024

Related U.S. Application Data

(63) Continuation of application No. PCT/EP2022/066830, filed on Jun. 21, 2022.

(30) Foreign Application Priority Data

Jun. 22, 2021 (DE) ..................... 10 2021 206 425.6
Jun. 21, 2022 (WO) ................. PCT/EP2022/066830

(51) Int. Cl.

*F02D 41/14* (2006.01)
*F02D 41/00* (2006.01)
*F02D 41/28* (2006.01)

(52) U.S. Cl.

CPC ..... *F02D 41/1402* (2013.01); *F02D 41/0097* (2013.01); *F02D 41/28* (2013.01); *F02D 2250/18* (2013.01)

(58) Field of Classification Search

CPC .. F02D 41/1402; F02D 41/0097; F02D 41/28; F02D 2250/18; F02D 31/001; F02D 41/1401; F02D 2041/1419; F02D 29/06
See application file for complete search history.

(56) References Cited

U.S. PATENT DOCUMENTS 7,778,761 B2 8/2010 Böckhoff et al.
10,103,666 B1 * 10/2018 Fan ........................... H02P 9/00
(Continued)

FOREIGN PATENT DOCUMENTS

DE 10 2008 036 300 B3 1/2010
DE 10 2014 011 226 A1 7/2015
(Continued)

OTHER PUBLICATIONS

International Search Report and Written Opinion dated Sep. 27, 2022 for International Patent Application No. PCT/EP2022/066830 (18 pages).

*Primary Examiner* — Joseph J Dallo
(74) *Attorney, Agent, or Firm* — TAYLOR & EDELSTEIN, P.C.

(57) ABSTRACT

A closed-loop control device, for closed-loop control of a power assembly including an internal combustion engine and a generator having an operative drive connection to the internal combustion engine, includes:

the closed-loop control device which is configured, in a first functional state, for:

detecting a generator frequency ($f_G$) of the generator as a controlled variable;

determining a control deviation ($e_f$) as a difference between the generator frequency ($f_G$) which is detected and a target generator frequency $f_{soll}$);

(Continued)

determining a target speed ($n_{soll}$) as a manipulated variable for controlling the internal combustion engine as a function of the control deviation ($e_f$);
using a control rule for determining the target speed ($n_{soll}$); and
being operatively connected to an open-loop control device of the internal combustion engine in such a way that the target speed ($n_{soll}$) can be transmitted by the closed-loop control device to an open-loop control device.

16 Claims, 6 Drawing Sheets

(56) References Cited

U.S. PATENT DOCUMENTS

| | | | | |
|---|---|---|---|---|
| 2002/0166324 | A1* | 11/2002 | Willis | H02J 1/14 60/777 |
| 2003/0048500 | A1* | 3/2003 | Fala | H04L 7/033 398/5 |
| 2004/0169563 | A1* | 9/2004 | Abbasi | H03L 7/095 331/160 |
| 2006/0082936 | A1* | 4/2006 | Ye | H02J 3/38 361/38 |
| 2012/0056602 | A1* | 3/2012 | Li | H02P 9/48 322/89 |
| 2014/0008988 | A1* | 1/2014 | Clarke | H02J 3/40 307/85 |
| 2014/0260293 | A1* | 9/2014 | Chen | F02C 9/00 60/773 |
| 2016/0336928 | A1* | 11/2016 | Kuznetsov | H02J 3/30 |
| 2017/0102165 | A1* | 4/2017 | Brekken | F24H 9/2021 |
| 2017/0170764 | A1* | 6/2017 | Blackwelder | H02P 6/20 |
| 2020/0091728 | A1* | 3/2020 | Cassoli | F03D 9/255 |
| 2021/0111651 | A1 | 4/2021 | Manson et al. | |
| 2021/0111652 | A1 | 4/2021 | Schweitzer et al. | |

FOREIGN PATENT DOCUMENTS

| | | | |
|---|---|---|---|
| JP | 2000-54879 | A | 2/2000 |
| JP | 2008-121432 | A | 5/2008 |
| JP | 6621607 | B2 | 11/2019 |
| WO | 2014/096537 | A1 | 6/2014 |

* cited by examiner

CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

CROSS REFERENCE TO RELATED APPLICATIONS

This is a continuation of PCT application no. PCT/EP2022/066830, entitled "CLOSED-LOOP CONTROL DEVICE FOR CLOSED-LOOP CONTROL OF A POWER ASSEMBLY COMPRISING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, AND METHOD FOR CLOSED-LOOP CONTROL OF A POWER ASSEMBLY", filed Jun. 21, 2022, which is incorporated herein by reference. PCT application no. PCT/EP2022/066830 claims priority to German patent application no. 10 2021 206 425.6, filed Jun. 22, 2021, which is incorporated herein by reference.

BACKGROUND OF THE INVENTION

1. Field of the Invention

The present invention relates to a closed-loop control device, and, more particularly, to a closed-loop control device for closed-loop control of a power assembly.

2. Description of the Related Art

Such a closed-loop control device is typically set up to control the speed of an internal combustion engine and, indirectly, the generator frequency of a generator having an operative drive connection to the internal combustion engine, a power assembly including the internal combustion engine and the generator. This is problematic insofar as a comparatively dynamic variable is used for the closed-loop control. As a result, the closed-loop control is intrinsically comparatively less robust, which has a particularly detrimental effect on steady-state closed-loop control behavior. In addition, the speed controller must be parameterized in a special way in order to be able to provide closed-loop control of the generator frequency. Furthermore, a separate adaptation is required for each speed controller of each specific power assembly.

What is needed in the art is a closed-loop control device for closed-loop control of a power assembly including an internal combustion engine and a generator having an operative drive connection to the internal combustion engine, a closed-loop control arrangement including such a closed-loop control device, a power assembly including an internal combustion engine and a generator having an operative drive connection to the internal combustion engine, including a closed-loop control device of this kind or including a closed-loop control arrangement of this kind, and a method for closed-loop control of a power assembly of this kind, wherein the described disadvantages do not occur.

SUMMARY OF THE INVENTION

The present invention relates to a closed-loop control device for closed-loop control of a power assembly comprising an internal combustion engine and a generator having an operative drive connection to the internal combustion engine, to a closed-loop control arrangement comprising such a closed-loop control device, to a power assembly comprising an internal combustion engine and a generator having an operative drive connection to the internal combustion engine, comprising a closed-loop control device of this kind or comprising a closed-loop control arrangement of this kind, and to a method for closed-loop control of a power assembly of this kind.

The present invention provides a closed-loop control device for closed-loop control of a power assembly including an internal combustion engine and a generator having an operative drive connection to the internal combustion engine, wherein the closed-loop control device is set up to detect a generator frequency of the generator as controlled variable in a first functional state. The closed-loop control device is additionally set up to determine a control deviation as the difference between the detected generator frequency and a target generator frequency. The closed-loop control device is furthermore set up to determine a target speed as a manipulated variable for controlling the internal combustion engine as a function of the control deviation. The closed-loop control device is also designed to use a control rule for determining the target speed. The closed-loop control device is designed to be operatively connected to an open-loop control device of the internal combustion engine in such a way that the target speed can be transmitted by the closed-loop control device to the open-loop control device. In particular, the closed-loop control device is designed as a generator controller and can be operatively connected to the open-loop control device of the internal combustion engine in such a way that the target speed can be transmitted from the closed-loop control device to the open-loop control device. By calculating the target speed as a function of the control deviation determined as the difference between the detected generator frequency and the target generator frequency, the closed-loop control device proposed here provides a comparatively slow closed-loop control system that can readjust deviations from the target generator frequency in a robust manner Since the closed-loop control device uses a control rule for this purpose, a particularly robust design of the frequency control is achieved. By contrast, the dynamics for the operation of the power assembly are provided separately by a speed controller implemented in the open-loop control device of the internal combustion engine. This results in a particularly robust design of the closed-loop control device for the purpose of frequency control. In addition, there is no need for an independent, separate parameterization of the speed controller of the internal combustion engine. The fact that the closed-loop control device itself is designed as a generator controller and can be operatively connected to the open-loop control device of the internal combustion engine means that it can be used flexibly with different internal combustion engines in different power assemblies. In particular, the closed-loop control device can also be used with internal combustion engines or power assemblies from other manufacturers.

In the context of the present technical teaching, a generator frequency is understood in particular to be the frequency of the electrical voltage induced in the generator, in particular the frequency of the electrical output voltage of the generator.

In the context of the present technical teaching, a control rule is understood in particular to mean a mathematical relationship, especially an equation, which describes the behavior of a controller. In particular, the control rule describes the relationship between the manipulated variable and the control deviation. In particular, the control rule describes how the manipulated variable behaves as a function of the control deviation. In an optional embodiment, the control rule describes the behavior of a controller selected from a group consisting of a P-controller, an I-controller, a D-controller, a PI-controller, a PD-controller, a PD1-controller, a PD2-controller, a PID-controller, a PT1-controller, a PT2-controller, a PI(DT1)-controller, and a combination of at least two of the aforementioned controllers. Control rules that describe the behavior of these and other controllers are generally known to a person skilled in the art.

The control rule is optionally implemented in the closed-loop control device, optionally in a hardware structure of the closed-loop control device, or in the form of software which is executed on the closed-loop control device during operation of the closed-loop control device. In particular, it is possible on the one hand for the manipulated variable to be calculated explicitly as a function of the control deviation by carrying out certain calculation steps in the software; however, it is also possible for the manipulated variable to be determined as a function of the control deviation on the basis of the specific interconnection of the hardware structure of the closed-loop control device, i.e., to be calculated indirectly, so to speak.

A closed-loop control device is understood to mean, in particular, a feedback control device. Correspondingly, a closed-loop control arrangement is understood to mean, in particular, a feedback control arrangement. Accordingly, an open-loop control device is understood to mean, in particular, a non-feedback control device.

In particular, a generator controller is understood to mean an open-loop control unit separate, i.e., in particular external, from the open-loop control device of the internal combustion engine, which unit is set up to control the generator frequency of the generator by specifying the target speed for the internal combustion engine, in particular to transmit the target speed as a manipulated variable to the open-loop control device of the internal combustion engine. In particular, a generator controller itself is not an open-loop control unit for the internal combustion engine, especially not a so-called engine control unit (ECU). In particular, the generator controller is provided in addition to the open-loop control device for the internal combustion engine, i.e., in addition to the open-loop control unit.

A power assembly is understood here in particular to be an arrangement consisting of an internal combustion engine and an electric machine operable as a generator, i.e., a generator, wherein the internal combustion engine has an operative drive connection to the generator in order to drive the generator. Thus, the power assembly is set up in particular to convert chemical energy converted into mechanical energy in the internal combustion engine into electrical energy in the generator. The power assembly can be operated alone—in so-called island operation—or also together with a plurality of—in particular a small number of—other power assemblies in a network, i.e., in island parallel operation. However, it is also possible that the power assembly is operated on a, in particular, larger power grid or energy supply grid, in particular a supra-regional power grid, in grid parallel operation.

The first functional state is optionally assigned island parallel operation or grid parallel operation of a power assembly equipped with the closed-loop control device. The closed-loop control device is optionally set up to assume the first functional state when a power assembly operatively connected to it is operated in island parallel operation or grid parallel operation—i.e., in particular together with at least one other power assembly or in a supra-regional power grid. As will also be explained hereinafter, the closed-loop control device is optionally set up in the first functional state to vary the target speed—in particular as a function of an instantaneous load request.

The closed-loop control device optionally has an interface, via which it can be operatively connected to an open-loop control device of the internal combustion engine in such a way that the target speed can be transmitted by the closed-loop control device to the open-loop control device via the interface. In an optional embodiment, the closed-loop control device is operatively connected—in particular via the interface—to a closed-loop control device of the internal combustion engine in such a way that the target speed can be transmitted from the closed-loop control device to the open-loop control device. Optionally, the closed-loop control device is also set up to receive at least one torque variable from the open-loop control device. In particular, the interface is optionally set up in such a way that, in addition to the output of the target speed, the at least one torque variable can be received via the interface. However, it is also possible that a separate, second interface is provided for receiving the at least one torque variable.

According to a development of the present invention, it is provided that the closed-loop control device is set up to adapt the control rule used to determine the target speed as a function of at least one adaptation variable, wherein the at least one adaptation variable is selected from a group consisting of a droop variable and a torque variable—calculated in particular by the open-loop control device of the internal combustion engine. This torque variable is optionally the at least one torque variable received via the interface or via a separate, second interface.

In particular, the use and very particularly the adaptation of the control rule make it possible to operate the closed-loop control device in combination with a multiplicity of different power assemblies, in particular with a multiplicity of different internal combustion engines, without the need for specific adaptation to the specific power assembly being operated, in particular to the specific internal combustion engine being operated. As a result, the power assembly, in particular the internal combustion engine, can be operated virtually adjustment-free, so that the adaptation effort otherwise required with conventional closed-loop control devices and methods is advantageously minimal, optionally completely eliminated, when using the technical teaching according to the present invention.

The fact that the control rule is adapted as a function of the at least one adaptation variable also makes it advantageous to keep a loop gain of the open control loop constant at a predetermined value, in particular at a value parameterized by the user, at all operating points, optionally across all operating points. This in turn simplifies the control behavior and thus, at the same time, also the adjustment of the closed-loop control device to the specific application. In particular, the closed-loop control device is easy to adapt in this way and can be used easily and reliably, which also saves costs in the application.

In the context of the present technical teaching, a loop gain of the open control loop is understood in particular as the product of a proportional coefficient of the control rule with the static (s=0) gain of the controlled system in the event of abrupt excitation.

In the context of the present technical teaching, adaptation of the control rule as a function of at least one adaptation variable is understood in particular to mean that at least one parameter determining the control rule is changed as a function of the at least one adaptation variable. In an optional embodiment, the control rule is adapted as a function of the at least one adaptation variable by changing the proportional coefficient of the control rule as a function of the at least one adaptation variable. In an optional embodiment, the control rule is determined in particular by the proportional coefficient as a parameter. Accordingly, an adaptation variable is understood to be a variable as a function of which the at least one parameter determining the control rule is changed. In particular, an adaptation variable is a variable on which a value of the at least one parameter determining the control rule depends.

The droop variable is optionally a variable that is provided and used to ensure a predetermined power distribution across a plurality of power assemblies. The droop variable is also referred to as the P-degree. Optionally, the droop variable in the first functional state is assigned a finite value of, in particular, a few percentage points, optionally at most 8%, optionally 4%. The droop variable also has a damping and stabilizing effect on the behavior of the power assembly in combination with other power assemblies. However, the droop variable can also be selected to be zero in the first functional state if the power distribution does not take place in the closed-loop control device itself, but in a higher-level control unit, which in particular is connected upstream of the closed-loop control device. In particular, the droop variable assumes the value zero if the closed-loop control device does not perform a power distribution.

In a second functional state, the droop variable optionally has the value zero. In an optional embodiment, the second functional state is assigned to island operation of a power assembly operatively connected to the closed-loop control device, i.e., to operation of the power assembly as the only power generation device in a—in particular comparatively small—power grid. Accordingly, no power distribution is required.

In an optional embodiment, the torque variable is, in particular, an instantaneous torque of the internal combustion engine, optionally a time-delayed, in particular filtered torque. Alternatively or additionally, the torque variable is optionally a variable derived from the—in particular instantaneous—torque of the internal combustion engine.

Optionally, the control rule is updated as a function of the at least one adaptation variable, wherein it is adapted—in particular automatically—in particular to changing operating points of the power assembly.

In an alternative optional embodiment, the closed-loop control device is set up to keep the control rule constant—in particular independently of an instantaneous operating point of the power assembly.

In particular, the closed-loop control device is optionally set up, in the first functional state, to adapt, in particular update, the control rule as a function of the at least one adaptation variable.

Optionally, the closed-loop control device is set up, in the first functional state, to adapt, in particular to update, the control rule used to determine the target speed as a function of the droop variable and the torque variable.

Optionally, the closed-loop control device is set up, in the second functional state, to keep constant the control rule used to determine the target speed.

For the purpose of the following derivation, a stationary state is considered, and therefore the variables concerned are given with the index "stat". However, the relationships, correlations and equations derived in this way are also valid in transient states.

The control rule is optionally determined in particular by:

$$k_p^f = 900\, v^f\left(1 + d\frac{M_{stat}}{M_V}\right), \tag{1}$$

with the proportional coefficient $k_p^f$, the predetermined, optionally predefinable loop gain $v^f$, the droop variable d, the torque $M_{stat}$ and the full-load torque $M_V$. The full-load torque $M_V$ corresponds in particular to the torque at 100% engine power of the internal combustion engine. A relationship such as equation (1) is sometimes also referred to as a control rule for short.

Equation (1) shows that in the first functional state—which is optionally assigned to island parallel operation or grid parallel operation, wherein the droop variable d is optionally different from zero—the proportional coefficient $k_p^f$ varies with the droop variable d and the torque $M_{stat}$ at a specified, constant loop gain $v^f$.

In the second functional state, which is optionally assigned to island operation, wherein the droop variable d is zero, the proportional coefficient $k_p^f$ is likewise constant if the loop gain $v^f$ is kept constant, i.e., the control rule as a whole is constant:

$$k_p^f = 900\, v^f \tag{2}$$

The relationship for the second functional state according to equation (2) thus results in particular as a limiting case for d=0 from equation (1). In particular, the closed-loop control device is set up to select the droop variable d to be zero in the second functional state.

Equation (1) can be derived in particular if the linearized representation of the control loop as shown in FIG. 3 is used as a starting point: In it, a target torque $M_{soll}$ is calculated as a function of a speed control deviation $e_n$, a speed proportional coefficient $k_p^n$ and a reset time $\tau_n^n$, specifically taking into account the complex variable s according to the following equation:

$$M_{soll}(s) = e_n(s)k_p^n\left(1 + \frac{1}{\tau_n^n s}\right). \tag{3}$$

At the same time, the following is read directly from FIG. 3 with the transfer functions shown there:

$$e_n(s) = n_{soll}(s) - \frac{n_N d}{M_V}\frac{k_p^n}{\tau_n^n s}e_n(s) - G_f^n(s)G_s^n(s)M_{soll}(s), \tag{4}$$

with the target speed $n_{soll}$ and the nominal speed $n_N$.

After solving equation (3) according to the speed control deviation $e_n$, reshaping equation (4) and inserting the solved equation (3) into the reshaped equation (4) and reshaping further, the following is obtained:

$$\frac{M_{soll}(s)}{n_{soll}(s)} = \frac{k_p^n M_V(1+\tau_n^n s)}{k_p^n M_V(1+\tau_n^n s)G_f^n(s)G_s^n(s) + n_N k_p^n d + \tau_n^n M_V s}. \tag{5}$$

The transfer function $G_s(s)$ of the controlled system of the frequency controller starting from the target speed $n_{soll}$ up to the output of the actual frequency $f_{ist}$ is read as:

$$G_s(s) = \frac{M_{soll}(s)}{n_{soll}(s)} G_s^f(s). \tag{6}$$

Inserting equation (5) into equation (6) gives the following result:

$$G_s(s) = \frac{k_p^n M_V(1+\tau_n^n s)}{k_p^n M_V(1+\tau_n^n s)G_f^n(s)G_s^n(s) + n_N k_p^n d + \tau_n^n M_V s} G_s^f(s). \tag{7}$$

The following applies for the steady-state operating state:

$$s \stackrel{\text{def}}{=} 0, \tag{8}$$

whereby equation (7) assumes the following form in the steady-state operating state:

$$G_s(0) = \frac{k_p^n M_V}{k_p^n M_V G_f^n(0)G_s^n(0) + n_N k_p^n d} G_s^f(0). \tag{9}$$

For the transfer functions of the internal combustion engine $G_s^n(0)$ and of the speed filter $G_f^n(0)$ on the one hand and of the generator $G_s^f(0)$ on the other hand, the following applies in the steady-state operating state:

$$G_s^f(0) = \frac{f_{stat}}{30 M_{stat}}, \tag{10}$$

with the frequency $f_{stat}$, $$G_s^n(0) = \frac{n_{stat}}{M_{stat}} = \frac{30 f_{stat}}{M_{stat}}, \tag{11}$$

taking into account the conversion of the speed $n_{stat}$—in $\text{min}^{-1}$—into the frequency—in Hz—, and $$G_f^n(0)=1. \tag{12}$$

The transfer function according to equation (10) can be derived from the model of the controlled system as a dual-mass oscillator, in particular in the following way:

Within the framework of the two-mass oscillator model, it is assumed that the internal combustion engine, with its moment of inertia $\theta_m$, is connected to the generator, which has the moment of inertia $\theta_L$, via a shaft, wherein this torque-transmitting connection is described by a spring stiffness c and a damping b (b describes here the dimensional damping, which is later converted into the dimensionless damping $\Psi$). With the angle of rotation $\rho_m$ of the internal combustion engine, the angle of rotation $\rho_L$ of the generator, the torque $M_m$ applied by the internal combustion engine, the load torque $M_L$ acting on the generator and the known notation with superimposed points for the time derivative, the following equations then result for the torque balance:

$$\theta_m \ddot{\rho}_m = M_m - c(\rho_m - \rho_L) - b(\dot{\rho}_m - \dot{\rho}_L), \text{ and} \tag{13}$$

$$\theta_L \ddot{\rho}_L = -M_L - c(\rho_L - \rho_m) - b(\dot{\rho}_L - \dot{\rho}_m). \tag{14}$$

With $$M_L = k_G \frac{\dot{\rho}_L}{2\pi}, \tag{15}$$

wherein $$k_G = \pi l^2 B^2 A^2 \frac{\cos\varphi}{|x_L|}, \tag{16}$$

with the number l and the area A of the conductor loops of the generator, the magnetic flux density B, and the impedance $X_L$ of the load electrically connected to the generator, wherein equation (16) is easily derived from a consideration of the electrodynamic load behavior of the generator, results after linearization in a steady-state operating state after some transformations:

$$\Delta\ddot{\rho}_m - \Delta\ddot{\rho}_L = -c(\Delta\rho_m - \Delta\rho_L)\left\{\frac{1}{\theta_m} + \frac{1}{\theta_L}\right\} - b(\Delta\dot{\rho}_m - \Delta\dot{\rho}_L)\left\{\frac{1}{\theta_m} + \frac{1}{\theta_L}\right\} + + \frac{\Delta M_m}{\theta_m} + \frac{1}{2\pi\theta_L} k_G \Delta\dot{\rho}_L. \tag{17}$$

The variables preceded by $\Delta$ are the deflections from the stationary operating point used in linearization. With $$\Omega := \sqrt{c\left\{\frac{1}{\theta_m} + \frac{1}{\theta_L}\right\}}, \text{ and} \tag{18}$$

$$\Psi := \frac{2\pi\Omega b}{c}, \tag{19}$$

whereby at the same time the dimensionless damping $\Psi$ is introduced, the following is given:

$$\Delta\ddot{\rho}_m - \Delta\ddot{\rho}_L = -\Omega^2(\Delta\rho_m - \Delta\rho_L) - \frac{\Psi\Omega}{2\pi}(\Delta\dot{\rho}_m - \Delta\dot{\rho}_L) + + \frac{\Delta M_m}{\theta_m} + \frac{1}{2\pi\theta_L} k_G \Delta\dot{\rho}_L, \text{ and} \tag{20}$$

$$\Delta\ddot{\rho}_L = \frac{1}{\theta_L}\left\{c(\Delta\rho_m - \Delta\rho_L) + \frac{c\Psi}{2\pi\Omega}(\Delta\dot{\rho}_m - \Delta\dot{\rho}_L) - \frac{1}{2\pi} k_G \Delta\dot{\rho}_L\right\}. \tag{21}$$

If the three variables $x_1$, $x_2$ and $x_3$ as follows are now introduced:

$$x_1 := \Delta\rho_m - \Delta\rho_L, \tag{22}$$

$$x_2 := \Delta\dot{\rho}_m - \Delta\dot{\rho}_L, \text{ and} \tag{23}$$

$$x_3 := \Delta\dot{\rho}_L, \tag{24}$$

this gives:

$$\begin{bmatrix}\dot{x}_1\\ \dot{x}_2\\ \dot{x}_3\end{bmatrix} = \begin{bmatrix}0 & 1 & 0\\ -\Omega^2 & -\frac{\Psi\Omega}{2\pi} & \frac{k_G}{2\pi\theta_L}\\ \frac{c}{\theta_L} & \frac{c\Psi}{2\pi\theta_L\Omega} & -\frac{k_G}{2\pi\theta_L}\end{bmatrix}\begin{bmatrix}x_1\\ x_2\\ x_3\end{bmatrix} + \begin{bmatrix}0\\ \frac{1}{\theta_m}\\ 0\end{bmatrix}\Delta M_m. \tag{25}$$

-continued

With $$\underline{x} := \begin{bmatrix} x_1 \\ x_2 \\ x_3 \end{bmatrix}, \tag{26}$$

$$A := \begin{bmatrix} 0 & 1 & 0 \\ -\Omega^2 & -\frac{\Psi\Omega}{2\pi} & \frac{k_G}{2\pi\theta_L} \\ \frac{c}{\theta_L} & \frac{c\Psi}{2\pi\theta_L\Omega} & -\frac{k_G}{2\pi\theta_L} \end{bmatrix}, \text{ and} \tag{27}$$

$$\underline{b} := \begin{bmatrix} 0 \\ \frac{1}{\theta_m} \\ 0 \end{bmatrix} \tag{28}$$

equation (25) corresponds as follows:

$$\dot{\underline{x}} = A\underline{x} + \underline{b}\Delta M_m. \tag{29}$$

After Laplace transformation and transition to the transfer function, the following is obtained:

$$G(s) = \frac{\underline{c}^T P(s)\underline{b}}{\|sI - A\|}, \tag{30}$$

with the adjugates P(s) of the matrix (sI−A) and the unit matrix I.

Since the speed deflection $\Delta n_L$ of the generator at the steady-state operating point is given by $$\Delta n_L = \frac{1}{2\pi} x_3, \tag{31}$$

the following is used to derive the transfer function for the frequency control:

$$y := \begin{bmatrix} 0 & 0 & \frac{1}{2\pi} \end{bmatrix} \underline{x}, \tag{32}$$

and $$\underline{c}^T := \begin{bmatrix} 0 & 0 & \frac{1}{2\pi} \end{bmatrix}. \tag{33}$$

With the definitions $$P_{stat} := 2\pi k_G n_{L,stat}^2, \tag{34}$$

wherein $n_{L,stat}$ is the speed of the generator at the steady-state operating point, and, after switching to dimensionless representation—with the speed specified in 1/min, the frequency in Hz and the power in kW, $$l_{stat} := \frac{9 \cdot 10^5 P_{stat}}{\pi^2 n_{L,stat}^2} \tag{35}$$

the following is obtained, taking into account $$f_G = \frac{n_L}{30}, \tag{36}$$

—due to 1500 $\min^{-1} \triangleq$ 50 Hz as the relationship between the speed of the internal combustion engine and the generator frequency—finally from equation (30) the transfer function according to equation (10)—with the indices G and m deleted for the purpose of simpler representation.

The transfer function for speed control is derived similarly. Because of equations (23) and (24), the deflection of the speed of the internal combustion engine in the steady state is $$\Delta n_m = \frac{\Delta\dot{\varphi}_m}{2\pi} = \frac{1}{2\pi}(x_2 + x_3), \tag{37}$$

and correspondingly in dimensionless representation, with specification of the speed in 1/min $$\Delta n_m = \frac{30}{\pi}(x_2 + x_3). \tag{38}$$

Therefore, the solution of equation (30) is now applied:

$$\underline{c}^T := [0\ 30/\pi 30/\pi]. \tag{39}$$

Thus, with the definitions according to equations (34) and (35) and also $$n_{m,stat} = n_{L,stat} \tag{40}$$

the transfer function of the controlled system for speed control according to equation (11) then readily follows analogously to the derivation of equation (10).

By inserting equations (10) to (12) into equation (9), performing some reshaping, and furthermore taking into account that the following applies in the steady state at nominal speed:

$$n_N = 30 f_{stat}, \tag{41}$$

the following is lastly obtained:

$$G_s(0) = \frac{1}{900\left(1 + d\frac{M_{stat}}{M_V}\right)}. \tag{42}$$

This results with:

$$k_p^f G_s(0) = v^f \tag{43}$$

in equation (1) in particular on the assumption of a controller that contains at least one P-controller, i.e., for example a P-controller, a PI-controller, a PID controller or a PI($DT_1$) controller.

According to a development of the present invention, it is provided that the closed-loop control device is set up to adapt the control rule by determining the proportional coefficient $k_p^f$ of the control rule in such a way that the predetermined loop gain $v^f$ of the open control loop is constant. In particular, the closed-loop control device is optionally set up to determine the proportional coefficient $k_p^f$ in such a way that the predetermined loop gain $v^f$—in particular over all operating points of the power assembly—remains constant. In particular, the closed-loop control device is advantageously easy to adapt in this way and can be used easily and reliably. In particular, equation (1) shows that it is possible to always adjust the proportional coefficient $k_p^f$ in such a way that the loop gain $v^f$ is constant—in particular irrespective of the current operating point of the power assembly.

The predetermined loop gain $v^f$ is optionally parameterizable, i.e., in particular can be set or preset by a user. In this way, a user of the closed-loop control device or a user of a power assembly that is operated with the closed-loop control device can set the loop gain $v^f$ in the desired manner. The proportional coefficient $k_p^f$ is then suitably adapted to the loop gain $v^f$ selected by the user. This has the advantage that no complex adjustment of the closed-loop control device to the power assembly is required.

In particular, the closed-loop control device is set up to select the proportional coefficient $k_p^f$ so as to be proportional to the predetermined loop gain $v^f$. The predetermined loop gain $v^f$ is optionally set, however, once or at most rarely by a user and otherwise kept constant. It can therefore be regarded as a constant, at least during operation of the power assembly.

According to a development of the present invention, it is provided that the closed-loop control device is set up to determine the proportional coefficient $k_p^f$ as a function of the droop variable d and the torque variable. In particular, the closed-loop control device is optionally set up to determine the proportional coefficient $k_p^f$ according to equation (1). In this way, the proportional coefficient $k_p^f$ can be updated particularly flexibly and precisely.

According to a development of the present invention, it is provided that the closed-loop control device is set up to adapt the proportional coefficient $k_p^f$ only as a function of the predetermined loop gain $v^f$, i.e., to select it to be optionally constant at least during operation of the power assembly. In particular, the closed-loop control device is set up to determine the proportional coefficient $k_p^f$ according to equation (2). This represents a simplified and, in particular, optimized design of the closed-loop control device in terms of computational effort.

According to a development of the present invention, it is provided that the closed-loop control device is set up to filter an instantaneous actual frequency of the generator and to use the filtered actual frequency as the detected generator frequency. This advantageously enables particularly quiet and therefore robust control. The instantaneous actual frequency is optionally measured directly at the generator. According to an optional embodiment, the instantaneous actual frequency is filtered using a $PT_1$ filter or a mean value filter, wherein the detected generator frequency results from the $PT_1$ filter or the mean value filter.

In accordance with a development of the present invention, it is provided that the closed-loop control device is set up to predefine the target speed so as to be constant in the second functional state. This is a particularly stable way of controlling the generator frequency, especially in island operation, wherein the speed controller in particular reacts directly to changing load requirements. For example, connecting a load leads to a downward deviation from the target speed, and removing a load leads to an upward deviation from the target speed, wherein the corresponding deviation is immediately corrected by the speed controller.

The present invention also provides a closed-loop control arrangement for closed loop control of a power assembly including an internal combustion engine and a generator having an operative drive connection to the internal combustion engine, which closed-loop control arrangement includes a closed-loop control device according to the present invention or a closed-loop control device according to one or more of the previously described exemplary embodiments and an open-loop control device operatively connected to the closed-loop control device for direct control of the internal combustion engine. The closed-loop control device is set up to transmit the target speed to the open-loop control device. In particular, the advantages which have already been explained in conjunction with the closed-loop control device are provided in conjunction with the closed-loop control arrangement.

The open-loop control device is optionally an engine controller of the internal combustion engine. The open-loop control device is particularly optionally a so-called engine control unit (ECU). The engine controller or the ECU is optionally set up to calculate at least one energization duration for at least one fuel injection valve, in particular an injector, of the internal combustion engine on the basis of the target speed—optionally via the intermediate step of a target torque. The open-loop control device optionally has a speed controller, or a speed controller is implemented in the open-loop control device. The speed controller is optionally designed as disclosed in patent specification DE 10 2008 036 300 B3.

According to a development of the present invention, it is provided that the open-loop control device is set up to determine, in particular to calculate, at least one torque variable and to transmit it to the closed-loop control device, wherein the closed-loop control device is set up to receive the at least one torque variable from the open-loop control device. The at least one torque variable is in particular the torque variable which is optionally used in the closed-loop control device to adapt, in particular to update, the control rule, in particular in accordance with equation (1).

According to a development of the present invention, it is provided that the open-loop control device is set up to determine, as the at least one torque variable, a variable which is selected from a group consisting of a—optionally filtered—target torque and an integral component for the target torque of a speed controller of the open-loop control device.

In an optional embodiment, the at least one torque variable is the target torque which is used in the open-loop control device to calculate an energization duration for the fuel injection valves, in particular as a manipulated variable of the speed controller. Alternatively or additionally, the at least one torque variable is optionally an integral component (I component) of the target torque. In particular, the at least one torque variable is optionally a torque, or an integral component of a torque, or a variable otherwise derived from a torque.

The present invention also provides a power assembly which has an internal combustion engine and a generator having an operative drive connection to the internal combustion engine. In addition, the power assembly has a closed-loop control device according to the present invention or a closed-loop control device according to one or more of the previously described exemplary embodiments. Alternatively, the power assembly has a closed-loop control arrangement according to the present invention or a closed-loop control arrangement according to one or more of the previously described exemplary embodiments. The closed-loop control device or the closed-loop control arrangement is operatively connected to the internal combustion engine and the generator of the power assembly. In particular, the advantages which have already been explained above in conjunction with the closed-loop control device or the closed-loop control arrangement are provided in conjunction with the power assembly.

Lastly, the present invention also provides a method for closed-loop control of a power assembly including an internal combustion engine and a generator having an operative drive connection to the internal combustion engine, wherein in a first operating mode a generator frequency of the generator is detected as a controlled variable. A control deviation is determined as the difference between the detected generator frequency and a target generator frequency. A target speed is determined as a manipulated variable for controlling the internal combustion engine as a function of the control deviation. In addition, the target speed is determined, in particular calculated, on the basis of a control rule. In particular, the advantages which have already been explained above in conjunction with the closed-loop control device, the closed-loop control arrangement or the internal combustion engine are provided in conjunction with the method.

The first operating mode of the method is optionally assigned here to island parallel operation or grid parallel operation of the power assembly.

Optionally, in the first operating mode the control rule used to determine the target speed is adapted as a function of at least one adaptation variable. The at least one adaptation variable is selected here from a group consisting of a droop variable and a torque variable—calculated in particular by the open-loop control device of the internal combustion engine.

Optionally, the control rule is kept constant in a second operating mode. Optionally, the target speed is kept constant in the second operating mode. Optionally, the droop variable is selected to be zero in the second operating mode. Island operation of the power assembly is optionally assigned to the second operating mode.

Optionally, in the first operating mode the control rule is adapted by determining a proportional coefficient of the control rule in such a way that a predetermined loop gain of the open control loop is constant, optionally remains constant.

Optionally, the proportional coefficient is determined as a function of the droop variable and the torque variable, optionally according to equation (1).

Optionally, according to an alternative embodiment of the method, the proportional coefficient is selected to be constant only as a function of the predetermined loop gain, i.e., optionally during operation of the internal combustion engine. In particular, the proportional coefficient is optionally determined according to equation (2).

Optionally, an instantaneous actual frequency of the generator is filtered and the filtered actual frequency is used as the detected generator frequency.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplification are not to be construed as limiting the scope of the invention in any manner.

DETAILED DESCRIPTION OF THE INVENTION

Figure 1:
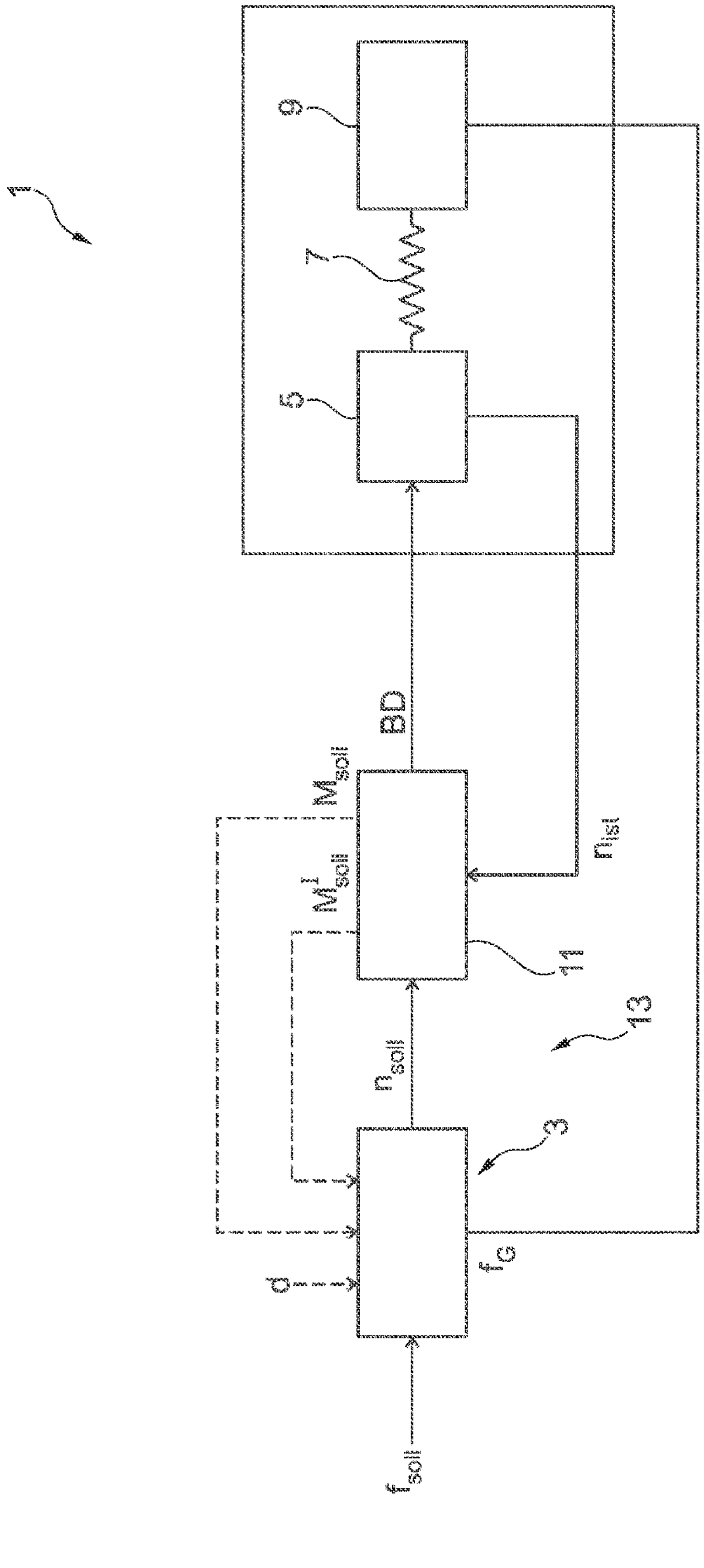
FIG. 1 shows a first schematic representation of an exemplary embodiment of a power assembly with an exemplary embodiment of a control device.

FIG. 1 shows a first schematic representation of an exemplary embodiment of a power assembly 1 with a first exemplary embodiment of a closed-loop control device 3. The power assembly 1 has an internal combustion engine 5 and a generator 9 which has an operative drive connection to the internal combustion engine 5 via a shaft 7 shown schematically. The closed-loop control device 3 is operatively connected to the internal combustion engine 5 on the one hand and to the generator 9 on the other.

In particular, the closed-loop control device 3 is set up for closed-loop control of the power assembly 1, wherein it is set up to detect a generator frequency $f_G$ of the generator 9 as a controlled variable, to determine a control deviation as the difference between the detected generator frequency $f_G$ and the target generator frequency $f_{soll}$, and to determine a target speed $n_{soll}$ as a manipulated variable for controlling the internal combustion engine 5 as a function of the control deviation. The closed-loop control device 3 is also designed to use a control rule for determining the target speed $n_{soll}$. The closed-loop control device 3 is designed as a generator controller and is operatively connected to an open-loop control device 11 of the internal combustion engine 5 in such a way that the target speed $n_{soll}$ can be transmitted by the closed-loop control device 3 to the open-loop control device 11. This also enables, at the same time, particularly robust frequency control and versatile usability of the closed-loop control device 3, in particular with a multiplicity of power assemblies 1.

The closed-loop control device 3 and the open-loop control device 11 together form a closed-loop control arrangement 13 for closed-loop control of the power assembly 1. The open-loop control device 11 is optionally designed as an engine controller, in particular as an engine control unit (ECU).

In particular, the open-loop control device 11 is set up to calculate at least one torque variable and to transmit it to the closed-loop control device 3, wherein the closed-loop control device 3 is set up to receive the at least one torque variable from the open-loop control device 11.

Figure 2:
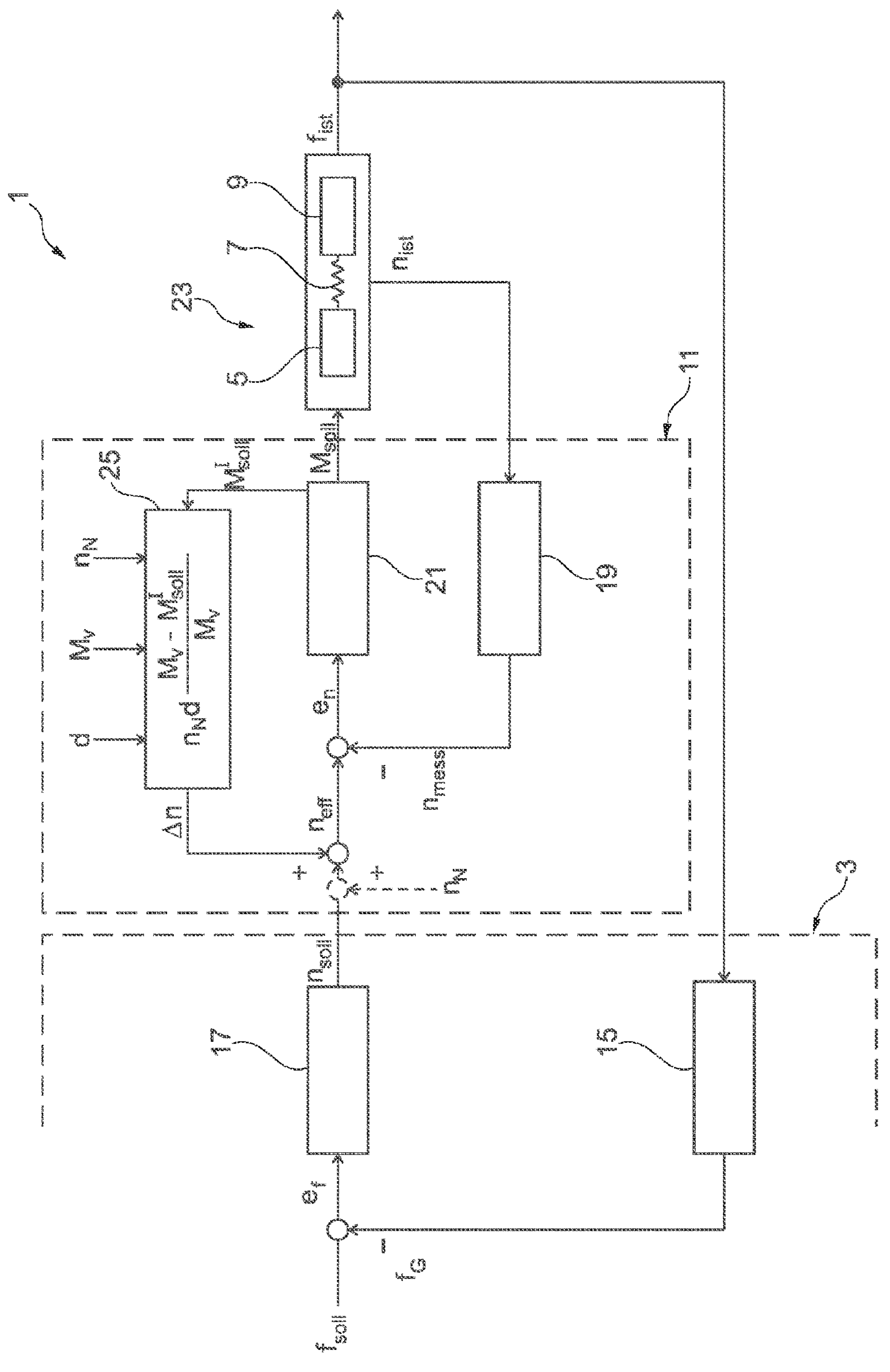
FIG. 2 shows a second schematic representation of the exemplary embodiment of the power assembly according to FIG. 1.

In addition, the open-loop control device 11 is optionally set up to determine a variable as the torque variable which is selected from a group consisting of a—optionally filtered—target torque $M_{soll}$ and an integral component of a speed controller 21—shown in FIG. 2—of the closed-loop control device 11, in particular an integral component $M_{soll}^I$ of the target torque $M_{soll}$.

Optionally, another input variable of the closed-loop control device 3 is a droop variable d.

The open-loop control device 11 also has the target speed $n_{soll}$ and a detected speed $n_{ist}$ as input variables. From this, the open-loop control device 11 calculates a speed control deviation. Lastly, the open-loop control device 11 uses this speed control deviation to calculate an energization duration BD for controlling the fuel injection valves of the internal combustion engine 5. Optionally, the open-loop control device 11 first calculates the target torque $M_{soll}$ from the speed control deviation and, from this, in turn, the energization duration BD.

FIG. 2 shows a second schematic representation of the exemplary embodiment of the power assembly 1 according to FIG. 1, in particular in the form of a block diagram.

Like and functionally similar elements are provided with the same reference signs in all figures, and therefore reference is made to the previous description in each case.

Optionally, an actual frequency $f_{ist}$ detected at the generator 9 is filtered in a frequency filter 15, and the filtered actual frequency $f_{ist}$ is used as the detected generator frequency $f_G$. The frequency filter 15 is optionally a $PT_1$ filter or a mean value filter. The frequency filter 15 is optionally part of the closed-loop control device 3, which also has a frequency controller 17 that calculates the target speed $n_{soll}$ from the control deviation $e_f$ as the difference between the target generator frequency $f_{soll}$ and the detected generator frequency $f_G$. The target speed $n_{soll}$ can be an absolute target speed—without reference to a nominal speed $n_N$—or a relative target speed—in particular as a difference from the nominal speed $n_N$. If the target speed $n_{soll}$ is a relative speed, the nominal speed $n_N$ is added to the output of the frequency controller 17 in the open-loop control device 11, as shown by dashed lines.

The open-loop control device 11 has a speed filter 19, which is optionally designed as a $PT_1$ filter or mean value filter. A measured speed $n_{mess}$, optionally used to calculate the speed control deviation $e_n$, is obtained by filtering the actual speed $n_{ist}$ measured directly at the internal combustion engine 5 using the speed filter 19. The open-loop control device 11 also has the speed controller 21, which calculates the target torque $M_{soll}$ from the speed control deviation $e_n$ and optionally, from this,—in a manner not shown—the energization duration BD. A controlled system 23 of the speed control loop assigned to the speed controller 21 includes the internal combustion engine 5 and the generator 9.

In the text which follows, the meaning of the droop variable d will be explained in more detail:

The droop variable d is optionally used to calculate a differential speed Δn, wherein an effective target speed $n_{eff}$ is calculated by adding the differential speed Δn to the target speed $n_{soll}$—alternatively the nominal speed $n_N$. The effective target speed $n_{eff}$ is used to calculate the speed control deviation $e_n$ by subtracting the measured speed $n_{mess}$ from the effective target speed $n_{eff}$. The differential speed Δn is calculated in a calculation block 25. The input variables of the calculation block 25 are the integral component $M_{soll}^I$, calculated by the speed controller 21, of the target torque $M_{soll}$, the droop variable d, the full-load torque $M_V$, and a nominal speed $n_N$ for the internal combustion engine 5, wherein the nominal speed $n_N$ can be 1500 $\text{min}^{-1}$, for example. The differential speed Δn is optionally calculated according to the following equation:

$$\Delta n = n_N d \frac{M_V - M_{soll}^I}{M_V}. \tag{44}$$

In a first functional state of the control device 3, which optionally corresponds to island parallel operation or grid parallel operation of the power assembly 1, the droop variable d is optionally set to a finite value, in particular in the single-digit percentage range, optionally to a maximum of 8%, optionally 4%. The droop variable d can be preset, i.e., in particular parameterized, by a user of the power assembly 1 or the closed-loop control device 3. In a second functional state of the control device 3, which is associated with island operation of the power assembly 1, the droop variable d is optionally set to zero, both in the closed-loop control device 3 and in the open-loop control device 11. If the droop variable d is zero, the differential speed Δn also vanishes, so that the effective target speed $n_{eff}$ is then equal to the target speed $n_{soll}$.

If the droop variable d is different from zero, the result is as follows: If the internal combustion engine 5 is running at full load, the integral component $M_{soll}^I$ of the target torque $M_{soll}$ is equal to the full-load torque $M_V$, so that the differential speed Δn is zero. If, on the other hand, the internal combustion engine 5 is idling, the integral component $M_{soll}^I$ is zero and the differential speed Δn is equal to the percentage of the nominal speed $n_N$ determined by the droop variable d. If the nominal speed is 1500 $\text{min}^{-1}$ and the droop variable d is 4%, the value of the differential speed Δn therefore varies between 0 $\text{min}^{-1}$ at full load and 60 $\text{min}^{-1}$ at idling speed.

Figure 3:
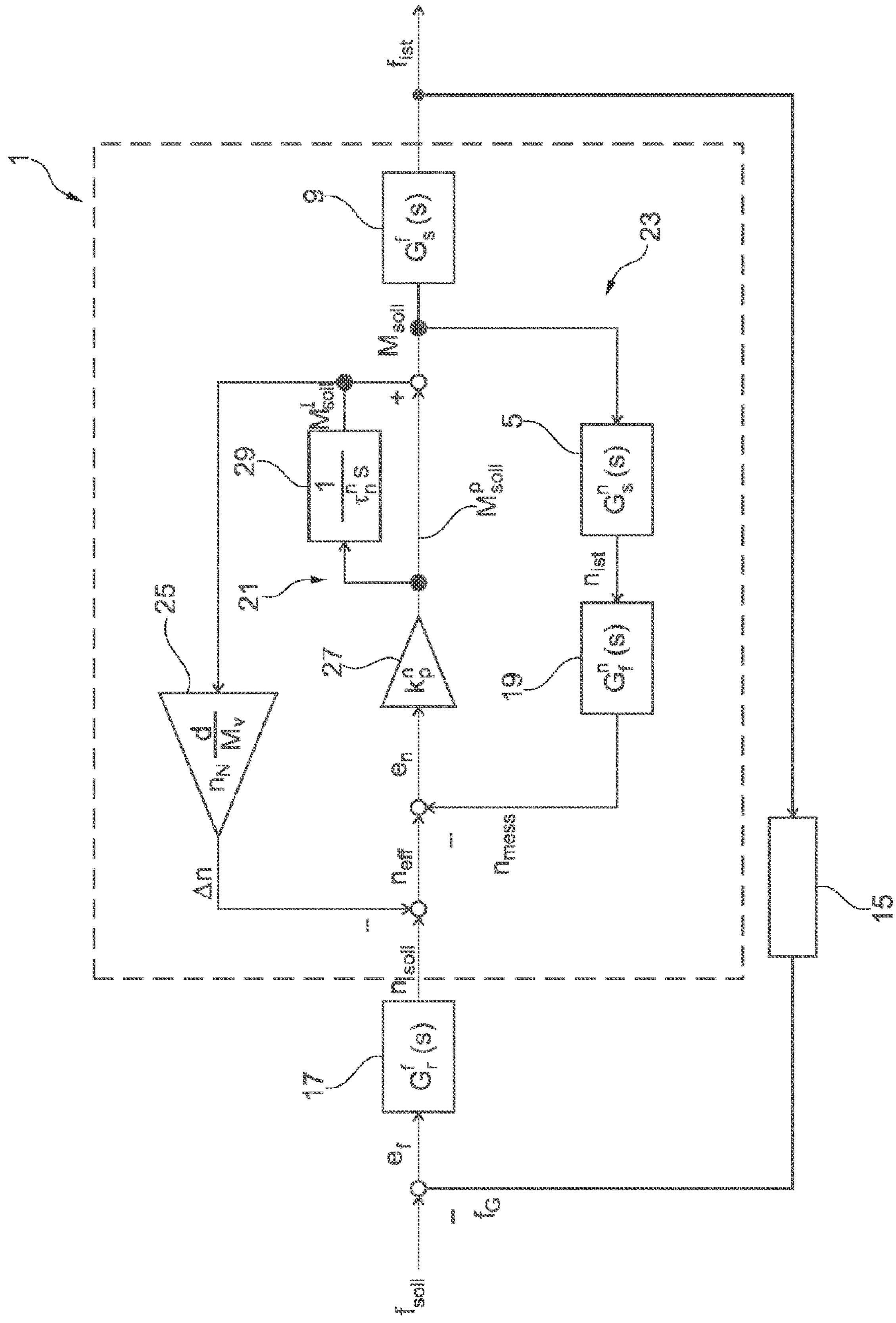
FIG. 3 shows a third schematic representation of the exemplary embodiment of the power assembly according to FIG. 1.

FIG. 3 shows a third schematic representation of the power assembly 1 according to FIG. 1, in this case as a linearized block diagram. The individual controllers are represented by transfer blocks with correspondingly assigned transfer functions. In contrast to FIG. 2, the controlled system 23 in FIG. 3 is shown divided into two transfer blocks, namely a transfer block assigned to the internal combustion engine 5, characterized by the transfer function $G_s^n(s)$, with the target torque $M_{soll}$ as the input variable and the actual speed $n_{ist}$ as the output variable, and a transfer block assigned to the generator 9, characterized by the transfer function $G_s^f(s)$, with the same input variable, namely the target torque $M_{soll}$, and the actual frequency $f_{ist}$ as output variable. The speed controller 21 is represented by a first multiplication element 27 for calculating a proportional component $M_{soll}^P$ of the target torque $M_{soll}$ by multiplication with the speed proportional coefficient $k_p^n$ and a first integration element 29 for calculating the integral component $M_{soll}^I$ of the target torque $M_{soll}$ by multiplication with a term $$\frac{1}{\tau_n^n s},$$

with the reset time $\tau_n^n$ and the complex variable s. Thus, the speed controller 21 has a PI transmission behavior here, since the first multiplication element 27 has a proportional transmission behavior and the first integration element 29 has an integral transmission behavior. The calculation block 25 is given a negative sign by the linearization here, so that the differential speed Δn calculated in the calculation block 25 is now subtracted from the target speed $n_{soll}$. Due to the linearization, the differential speed Δn is calculated in the calculation block 25 according to the following modified equation:

$$\Delta n = n_N d \frac{M_{soll}^I}{M_V}. \tag{45}$$

Figure 4:
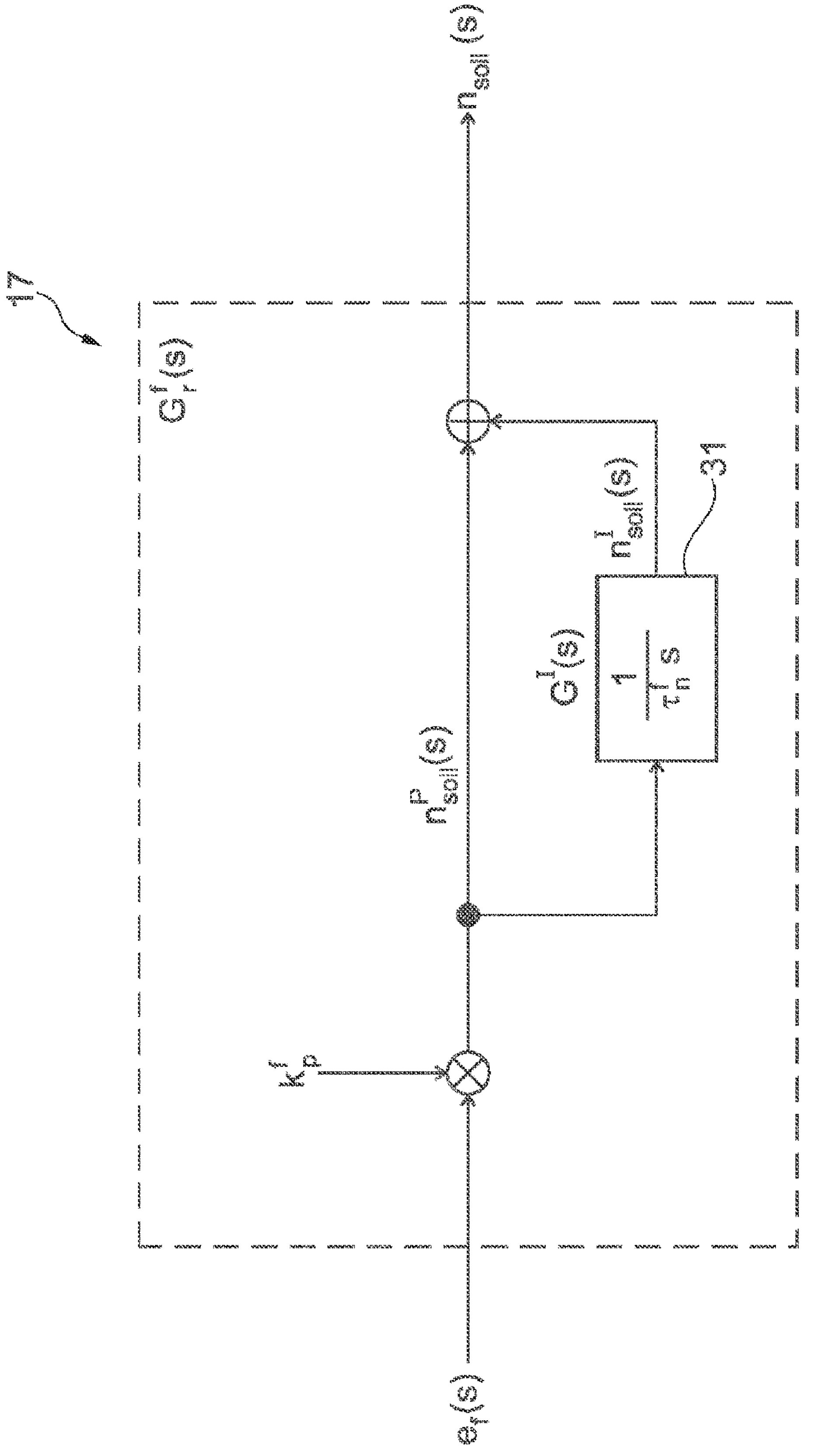
FIG. 4 shows a detailed representation of a controller for frequency control.

FIG. 4 shows a schematic representation of a detail of the frequency controller 17 according to FIG. 3, which is optionally implemented as a PI controller. The control deviation $e_f$ is first multiplied here by the proportional coefficient $k_p^f$ so that a proportional component $n_{soll}^P$ for the target speed $n_{soll}$ is obtained. In a second integration element 31, the proportional component $n_{soll}^P$, by division by the product of the reset time $\tau_n^f$ with the complex variable s, calculates an integral component $n_{soll}^I$ for the target speed $n_{soll}$, which is then added to the proportional component $n_{soll}^P$. This results in the target speed $n_{soll}$ as output variable. The transfer function of the frequency controller 17 is therefore given by:

$$G_r^f(s) = k_p^f\left(1 + \frac{1}{T_n^f s}\right). \tag{46}$$

The calculation of the proportional coefficient $k_p^f$ is optionally calculated according to equation (1).

The control rule is adapted here in particular by determining the proportional coefficient $k_p^f$ in such a way that the predetermined loop gain $v^f$ is constant, in particular remains constant.

Figure 5:
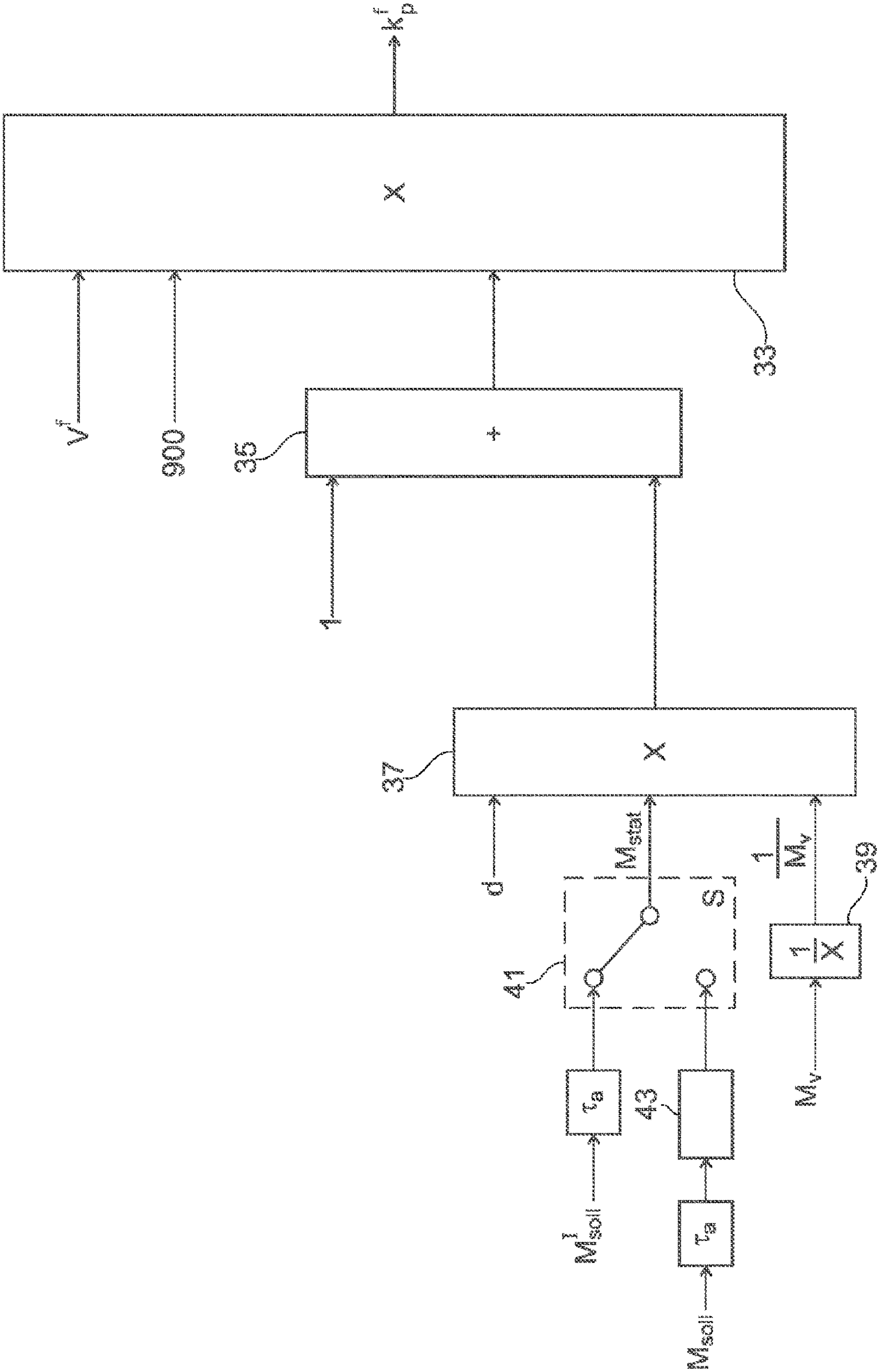
FIG. 5 shows a detailed representation of an embodiment of a method for calculating the proportional coefficient for the frequency control.

FIG. 5 shows a detailed representation of an embodiment of a method for calculating the proportional coefficient $k_p^f$ for the frequency control according to equation (1). In a second multiplication element 33, the predetermined loop gain $v^f$ is, to this end, multiplied by the factor 900 and an output of a summation element 35. The proportional coefficient $k_p^f$ is obtained as the output of the second multiplication element 33. In the summation element 35, the number 1 is added to the output of a third multiplication element 37. In the third multiplication element 37, the droop variable d is multiplied by the torque $M_{stat}$ and the reciprocal value of the full-load torque $M_V$. The reciprocal value of the full-load torque $M_V$ is formed from the full-load torque $M_V$ in a division element 39.

The torque $M_{stat}$ can be determined in two different ways: On the one hand, from the integral component $M_{soll}^I$ delayed by a sampling step $\tau_a$. In this case, a switch 41 provided for switching between the two calculation types is arranged in the upper switch position according to FIG. 5.

Alternatively, the torque $M_{stat}$ can be calculated from the target torque $M_{soll}$ calculated by the open-loop control device 11. This is also first delayed by a sampling step $\tau_a$ and then filtered by a filter 43, wherein the torque filter 43 is optionally a $PT_1$ filter. This calculation is active when the switch 41 is in the lower switch position according to FIG. 5.

Figure 6:
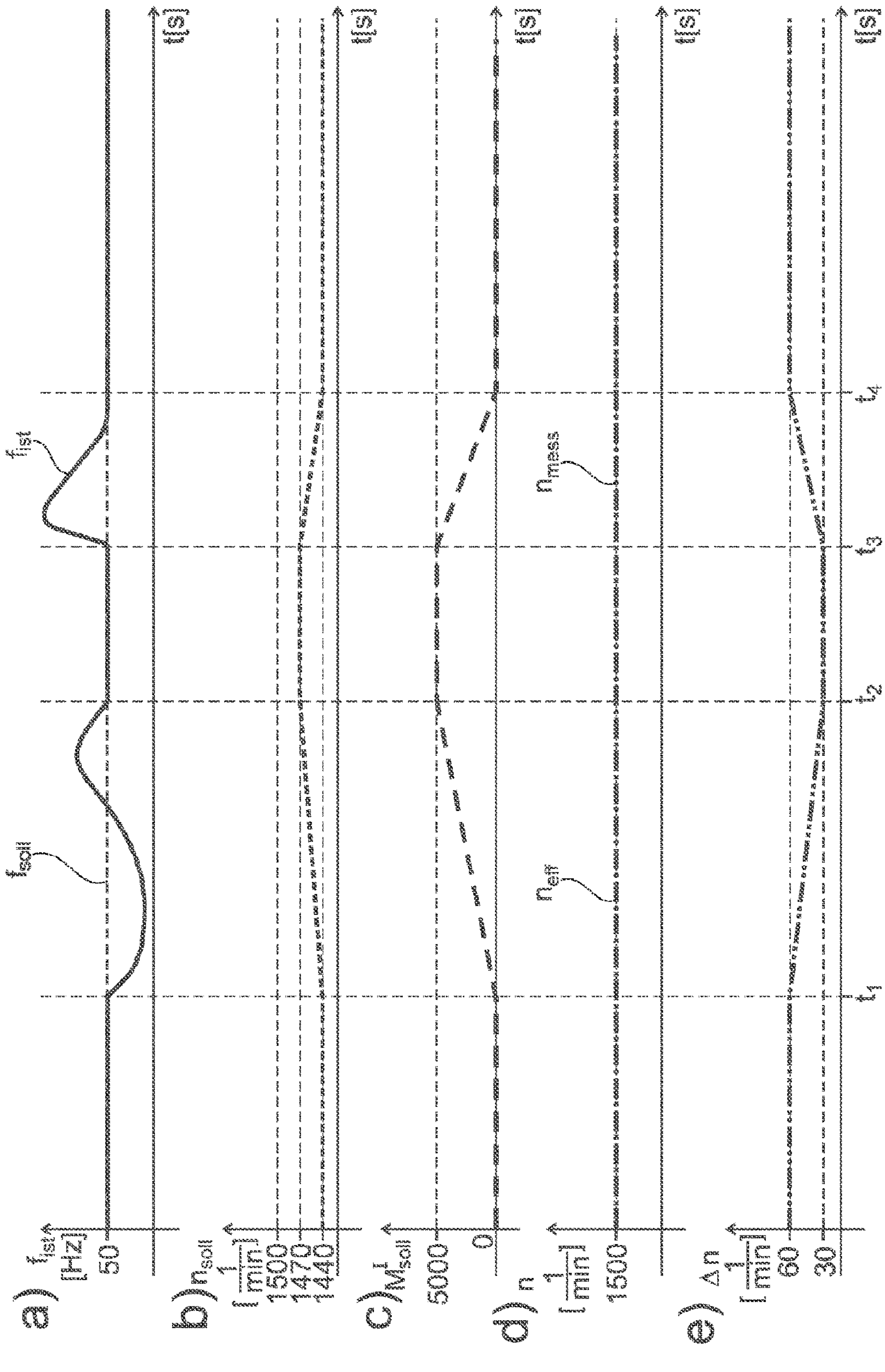
FIG. 6 shows a schematic, diagrammatic representation of the mode of operation of an embodiment of a method for closed-loop control of a power assembly.

FIG. 6 shows a schematic, diagrammatic representation of the mode of operation of an embodiment of a method for closed-loop control of the power assembly 1. The method is illustrated here using five time graphs. In particular, a first time graph at a) shows a time curve of the actual frequency $f_{ist}$ of the generator 9. A second time graph at b) shows a time curve of the target speed $n_{soll}$ in the unit $\min^{-1}$. A third time graph at c) shows the time curve of the integral component $M_{soll}^I$ of the target torque $M_{soll}$. A fourth time graph at d) shows the time curve of the speed n of the internal combustion engine 5. Lastly, a fifth time graph at e) shows the time curve of the differential speed $\Delta n$.

In the first time graph at a), a first, dashed curve represents the course of the constant target frequency $f_{soll}$ of the generator 9, which is optionally 50 Hz. At a first point in time $t_1$ a load is switched on, which causes the actual frequency $f_{ist}$, which is represented by a second, solid curve, to drop. Subsequently, the actual frequency $f_{ist}$ rises again, reaches the value of the target frequency $f_{soll}$ again, overshoots and finally settles at the value of the target frequency $f_{soll}$ at a second point in time $t_2$.

At a third point in time $t_3$, the load is dropped again. The actual frequency $f_{ist}$ increases as a result and finally settles again at the target frequency $f_{soll}$ at a fourth point in time $t_4$.

In the time graphs shown, the internal combustion engine 5 is operated in grid parallel operation. The set droop variable is 4%.

The second time graph at b) shows the time curve of the target speed $n_{soll}$. The differential speed $\Delta n$ is shown in the fifth time graph. The load connection shown in the first time graph represents the connection of a 50% load—based on full load—and this 50% load is to be dropped again when the load is switched off. Up to the first point in time $t_1$, the internal combustion engine 5 is in a load-free state, resulting in a value of 60 $\min^{-1}$ for the differential speed $\Delta n$—as shown in the fifth time graph. Since a sum of the target speed $n_{soll}$ and the differential speed $\Delta n$ at a target frequency for the generator 9 of 50 Hz must result in an effective target speed $n_{eff}$ of 1500 $\min^{-1}$, the target speed $n_{soll}$ up to the first point in time $t_1$ is 1440 $\min^{-1}$. At the first point in time $t_1$, the 50% load is switched on and is present at the second point in time $t_2$. The differential speed $\Delta n$ is therefore 30 $\min^{-1}$ at the second point in time. The target speed $n_{soll}$ is therefore 1470 $\min^{-1}$ at the second point in time $t_2$. The target speed $n_{soll}$ therefore increases from 1440 $\min^{-1}$ to 1470 $\min^{-1}$ from the first point in time $t_1$ to the second point in time $t_2$. By contrast, the differential speed $\Delta n$ drops from 60 $\min^{-1}$ to 30 $\min^{-1}$ during this period.

The integral component $M_{soll}^I$ shown in the third time graph at c) is 0 Nm up to the first time $t_1$, as no load is applied. Starting from the first time $t_1$, it then increases up to the second time $t_2$ to the value 5000 Nm, which corresponds to a load of 50% of the full load torque $M_V$ in the exemplary embodiment shown here.

In the fourth time graph at d), the measured speed $n_{mess}$ and the effective target speed $n_{eff}$ are shown one above the other. Both values are typically constant in grid parallel operation and identical to 1500 $\min^{-1}$.

Switching off the load at the third time $t_3$ results in the target speed $n_{soll}$ in the second time graph being reduced back to its initial value of 1440 $\min^{-1}$. The integral component $M_{soll}^I$ according to the third time graph is reduced again to the value 0 Nm. The differential speed $\Delta n$ shown in the fifth time graph is increased again to the value of 60 $\min^{-1}$.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A closed-loop control device for closed-loop control of a power assembly including an internal combustion engine and a generator having an operative drive connection to the internal combustion engine, the closed-loop control device comprising:

the closed-loop control device which is configured, in a first functional state, for:

detecting a generator frequency ($f_G$) of the generator as a controlled variable;

determining a control deviation ($e_f$) as a difference between the generator frequency ($f_G$) which is detected and a target generator frequency ($f_{soll}$);

determining a target speed ($n_{soll}$) as a manipulated variable for controlling the internal combustion engine as a function of the control deviation ($e_f$);

using a control rule for determining the target speed ($n_{soll}$); and being operatively connected to an open-loop control device of the internal combustion engine in such a way that the target speed ($n_{soll}$) can be transmitted by the closed-loop control device to the open-loop control device.

2. The closed-loop control device according to claim 1, wherein the closed-loop control device is configured for adapting the control rule used to determine the target speed ($n_{soll}$) as a function of at least one adaptation variable, and wherein the at least one adaptation variable is selected from a group consisting of a droop variable (d) and a torque variable.

3. The closed-loop control device according to claim 2, wherein the torque variable is calculated by the open-loop control device of the internal combustion engine.

4. The closed-loop control device according to claim 2, wherein the closed-loop control device is configured for adapting the control rule by determining a proportional coefficient ($k_p^f$) of the control rule in such a way that a predetermined loop gain ($v^f$) of an open control loop is constant.

5. The closed-loop control device according to claim 4, wherein the closed-loop control device is configured for determining the proportional coefficient ($k_p^f$) as a function of the droop variable (d) and the torque variable.

6. The closed-loop control device according to claim 4, wherein the closed-loop control device (3) is configured for selecting the proportional coefficient ($k_p^f$) only as a function of the predetermined loop gain ($v^f$).

7. The closed-loop control device according to claim 1, wherein the closed-loop control device is configured for filtering an actual frequency ($f_{ist}$)—which is instantaneous—of the generator and for using the actual frequency ($f_{ist}$)—which is filtered—as the generator frequency ($f_G$) which is detected.

8. The closed-loop control device according to claim 1, wherein the closed-loop control device is configured for, in a second functional state, predefining the target speed ($n_{soll}$) to be constant.

9. The closed-loop control device according to claim 8, wherein the closed-loop control device is configured for selecting the droop variable (d) to be zero.

10. A closed-loop control arrangement for closed-loop control of a power assembly including an internal combustion engine and a generator having an operative drive connection to the internal combustion engine, the closed-loop control arrangement comprising:

a closed-loop control device for closed-loop control of a power assembly, the closed-loop control device being configured, in a first functional state, for:

detecting a generator frequency ($f_G$) of the generator as a controlled variable;

determining a control deviation ($e_f$) as a difference between the generator frequency ($f_G$) which is detected and a target generator frequency ($f_{soll}$);

determining a target speed ($n_{soll}$) as a manipulated variable for controlling the internal combustion engine as a function of the control deviation ($e_f$);

using a control rule for determining the target speed ($n_{soll}$); and being operatively connected to an open-loop control device of the internal combustion engine in such a way that the target speed ($n_{soll}$) can be transmitted by the closed-loop control device to the open-loop control device; and the open-loop control device which is operatively connected to the closed-loop control device for direct control of the internal combustion engine, the closed-loop control device being configured for transmitting the target speed ($n_{soll}$) to the open-loop control device.

11. The closed-loop control arrangement according to claim 10, wherein the open-loop control device is configured for determining at least one torque variable and for transmitting the at least one torque variable to the closed-loop control device, and wherein the closed-loop control device is configured for receiving the at least one torque variable from the open-loop control device.

12. The closed-loop control arrangement according to claim 11, wherein the open-loop control device is configured for determining, as the at least one torque variable, a variable which is selected from a group consisting of: a target torque ($M_{soll}$) and an integral component ($M_{soll}^I$) of a speed controller of the open-loop control device.

13. The closed-loop control arrangement according to claim 12, wherein the target torque ($M_{soll}$) is filtered.

14. A power assembly, comprising:

an internal combustion engine;

a generator including an operative drive connection to the internal combustion engine; and one of:

(a) a closed-loop control device for closed-loop control of the power assembly, the closed-loop control device being configured, in a first functional state, for:

detecting a generator frequency ($f_G$) of the generator as a controlled variable;

determining a control deviation ($e_f$) as a difference between the generator frequency ($f_G$) which is detected and a target generator frequency ($f_{soll}$);

determining a target speed ($n_{soll}$) as a manipulated variable for controlling the internal combustion engine as a function of the control deviation ($e_f$);

using a control rule for determining the target speed ($n_{soll}$); and being operatively connected to an open-loop control device of the internal combustion engine in such a way that the target speed ($n_{soll}$) can be transmitted by the closed-loop control device to the open-loop control device; and (b) a closed-loop control arrangement for closed-loop control of the power assembly, the closed-loop control arrangement including:

a closed-loop control device for closed-loop control of the power assembly, the closed-loop control device being configured, in a first functional state, for:

detecting a generator frequency ($f_G$) of the generator as a controlled variable;

determining a control deviation ($e_f$) as a difference between the generator frequency ($f_G$) which is detected and a target generator frequency ($f_{soll}$);

determining a target speed ($n_{soll}$) as a manipulated variable for controlling the internal combustion engine as a function of the control deviation ($e_f$);

using a control rule for determining the target speed ($n_{soll}$); and being operatively connected to an open-loop control device of the internal combustion engine; and the open-loop control device which is operatively connected to the closed-loop control device for direct control of the internal combustion engine, the closed-loop control device being configured for transmitting the target speed ($n_{soll}$) to the open-loop control device;

wherein the closed-loop control device or the closed-loop control arrangement is operatively connected to the internal combustion engine and the generator of the power assembly.

15. A method for closed-loop control of a power assembly including an internal combustion engine and a generator having an operative drive connection to the internal combustion engine, the method comprising the steps of:

in a first operating mode, detecting a generator frequency ($f_G$) of the generator as a controlled variable;

determining a control deviation ($e_f$) as a difference between the generator frequency ($f_G$) which is detected and a target generator frequency ($f_{soll}$);

determining a target speed ($n_{soll}$) as a manipulated variable for controlling the internal combustion engine as a function of the control deviation ($e_f$); and determining the target speed ($n_{soll}$) based on a control rule.

16. The method according to claim 15, wherein the step of determining the target speed ($n_{soll}$) based on the control rule includes calculating the target speed ($n_{soll}$) based on the control rule.

* * * * *